United States Patent
Kano et al.

(10) Patent No.: US 9,553,530 B2
(45) Date of Patent: Jan. 24, 2017

(54) POWER CONVERTER

(71) Applicant: DENSO CORPORATION, Kariya, Aichi-pref. (JP)

(72) Inventors: Ryo Kano, Kariya (JP); Takashi Suzuki, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/046,173

(22) Filed: Feb. 17, 2016

(65) Prior Publication Data
US 2016/0248349 A1    Aug. 25, 2016

(30) Foreign Application Priority Data
Feb. 19, 2015 (JP) .................................. 2015-30736

(51) Int. Cl.
*H02P 6/10* (2006.01)
*H02P 29/00* (2016.01)

(52) U.S. Cl.
CPC ............. *H02P 6/10* (2013.01); *H02P 29/0088* (2013.01)

(58) Field of Classification Search
CPC ......... H02M 1/12; H02M 7/487; B62D 5/046; H02P 6/10; H02P 6/14
USPC .......... 318/400.23, 400.01, 400.15, 400.26, 318/400.36, 432, 496
See application file for complete search history.

(56) References Cited

U.S. PATENT DOCUMENTS

| | | | | |
|---|---|---|---|---|
| 8,339,089 B2* | 12/2012 | Suzuki | ................... | B62D 5/046 318/254.1 |
| 8,436,573 B2* | 5/2013 | Uryu | ..................... | B62D 5/046 318/400.01 |
| 8,604,730 B2* | 12/2013 | Suzuki | ................... | H02M 1/14 318/400.02 |
| 2011/0043273 A1* | 2/2011 | Blasko | ................. | H02M 5/271 327/489 |
| 2011/0221375 A1 | 9/2011 | Suzuki | | |
| 2014/0253006 A1* | 9/2014 | Satou | .................... | H02P 29/032 318/442 |

OTHER PUBLICATIONS

U.S. Appl. No. 15/046,180, filed Feb. 17, 2016, Suzuki, Takashi.

* cited by examiner

*Primary Examiner* — Bentsu Ro
*Assistant Examiner* — Thai Dinh
(74) *Attorney, Agent, or Firm* — Knobbe, Martens, Olson & Bear, LLP

(57) ABSTRACT

A power converter a controller that includes an instruction calculator calculating a first voltage instruction value that is applied to a first winding group, for example. An application voltage to the first winding group is controlled, for example, in a first period so that a first neutral point voltage shifts below a center-of-output value of an outputtable range is outputted, and a second neutral point voltage shifts above the center-of-output value of the outputtable range. The instruction calculator calculates the first instruction value for enabling a switching between the periods, after a lapse of a switch period that is variably calculated based on a preset physical quantity. In such manner, a ripple of a torque or an electric current accompanying the switching between the periods is reduced.

8 Claims, 8 Drawing Sheets

POWER CONVERTER

CROSS REFERENCE TO RELATED APPLICATION

The present application is based on and claims the benefit of priority of Japanese Patent Application No. 2015-030736, filed on Feb. 19, 2015, the disclosure of which is incorporated herein by reference.

TECHNICAL FIELD

The present disclosure generally relates to a power converter for converting an electric power.

BACKGROUND INFORMATION

Conventionally, the power converter for converting an electric power that is supplied to a motor with two sets of winding group is known in the art. For example, in a patent document, JP 2011-188674 A (Patent document 1), for the ease of distribution of heat generation to each of the winding groups, the power converter has two inverters corresponding to two sets of winding group, and the shift direction of the duty instruction signal concerning the drive of each of the inverters is switched at preset intervals.

As disclosed in the patent document 1, when the shift direction of the duty instruction signal is switched, such switching may cause a torque ripple as well as a vibration and a sound.

SUMMARY

In an aspect of the present disclosure, a power converter of the present disclosure that converts an electric power supplied to a rotating electric machine, having a first winding group and a second winding group that include a first inverter, a second inverter, and a controller.

The first inverter has a first switching element corresponding to each of plural phases in the first winding group.

The second inverter has a second switching element corresponding to each of plural phases in the second winding group.

The controller includes an instruction calculator. The instruction calculator calculates a first voltage instruction value that is applied to the first winding group, and a second voltage instruction value that is applied to the second winding group.

An application voltage to the first winding group is controlled in the following manner in a first period and in a second period. That is, (i) in the first period, a first neutral point voltage applied to the first winding group shifts below a center-of-output value of an outputtable range of the inverter, and a second neutral point voltage applied to the second winding group shifts above the center-of-output value of the outputtable range of the inverter. Also, (ii) in the second period, the first neutral point voltage shifts above the center-of-output value of the outputtable range, and the second neutral point voltage shifts below the center-of-output value of the outputtable range of the inverter.

Further, the instruction calculator calculates the first instruction value and the second instruction value for enabling a switching between the first period and the second period after a lapse (i.e., at an interval) of a switch period that is variably calculated based on a preset physical quantity.

In the present disclosure, switching between the two states (i.e., (i) one state in which the first neutral point voltage is shifted below the center-of-output value, and the second neutral point voltage is shifted above the center-of-output value; and (ii) the other state in which the state where the first neutral point voltage is shifted above the center-of-output value, and the second neutral point voltage is shifted below the center-of-output value, is performed). Thereby, the unevenness of heat generation among the switching elements is reduced.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereafter, the power converter of the present disclosure is described based on the drawings. In the following embodiments, like parts have like numbers and the description of the like part is not repeated.

First Embodiment

The power converter in the first embodiment of the present disclosure is described based on FIGS. 1-5.

A power converter 1 of the present embodiment is disposed in a non-illustrated vehicle together with a motor 10, and is applied to an electric power steering apparatus 5 for assisting a steering operation performed by the driver with the motor 10, which is also described as a rotating electric machine.

Figure 1:
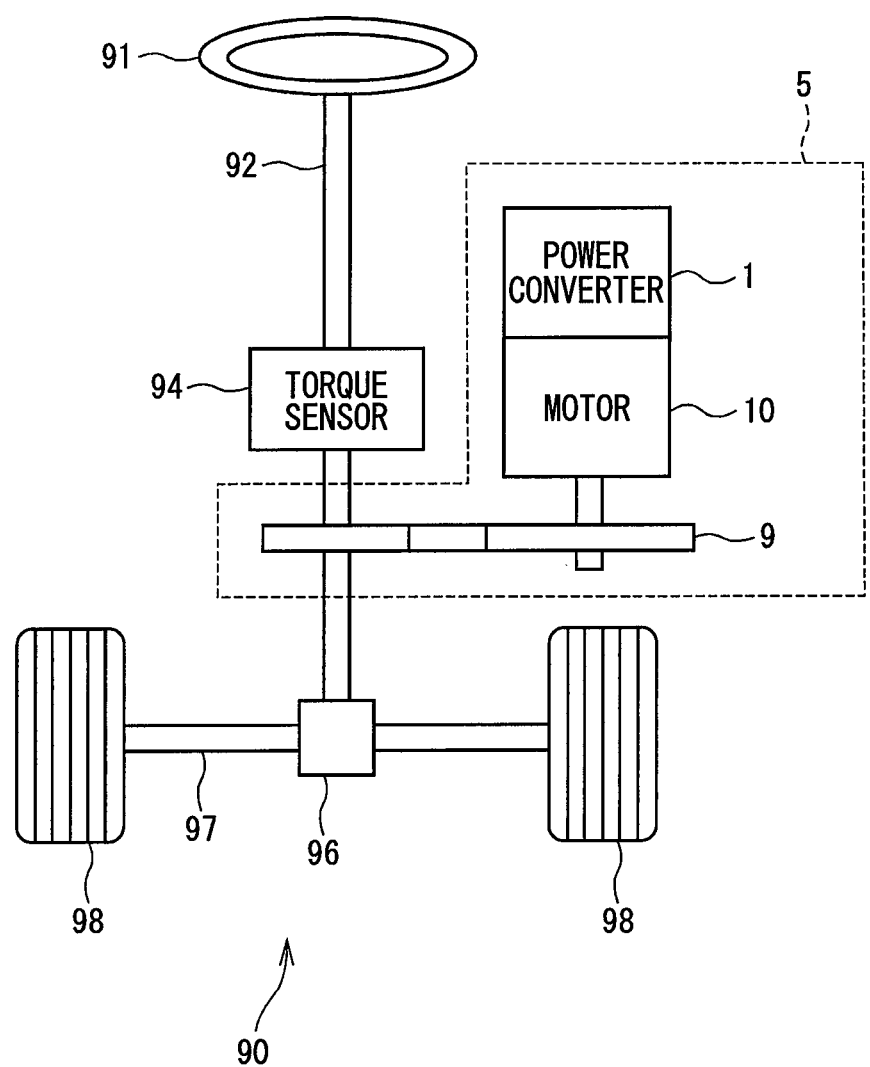
FIG. 1 is a schematic diagram of an electric power steering apparatus in a first embodiment of the present disclosure.

FIG. 1 shows an entire configuration of a steering system 90 provided with the electric power steering apparatus 5.

The steering system 90 comprises a steering wheel (i.e., steering wheel) 91, a steering shaft 92, a pinion gear 96, a rack shaft 97, wheels 98, the electric power steering apparatus 5, and the like.

The steering wheel 91 is connected with the steering shaft 92. On the steering shaft 92, a torque sensor 94 that detects the steering torque inputted to the steering shaft 92 by the driver's operation of the steering wheel 91 is disposed. The pinion gear 96 is disposed at the tip of the steering shaft 92, and the pinion gear 96 engages with the rack shaft 97. A pair of wheels 98 are connected with both ends of the rack shaft 97 via a tie rod, etc.

Thereby, when the driver rotates the steering wheel 91, the steering shaft 92 connected to the steering wheel 91 rotates. The rotational movement of the steering shaft 92 is turned into the linear movement of the rack shaft 97 by the pinion gear 96, and the wheels 98 are steered by an angle according to the amount of displacement of the rack shaft 97.

The electric power steering apparatus 5 has a motor 10 that outputs an assist torque for assisting a steering operation of the steering wheel 91 by the driver, a power converter 1 for a drive control of the motor, a speed reduction gear 9 that reduces a rotation speed of the motor 10 for outputting the rotation to the steering shaft 92 or to the rack shaft 97, and the like.

The motor 10 is driven by receiving a supply of an electric power from a battery 30 (refer to FIG. 2), which is a direct-current power supply, and rotates the speed reduction gear 9 back and forth (i.e., reciprocally).

Figure 2:
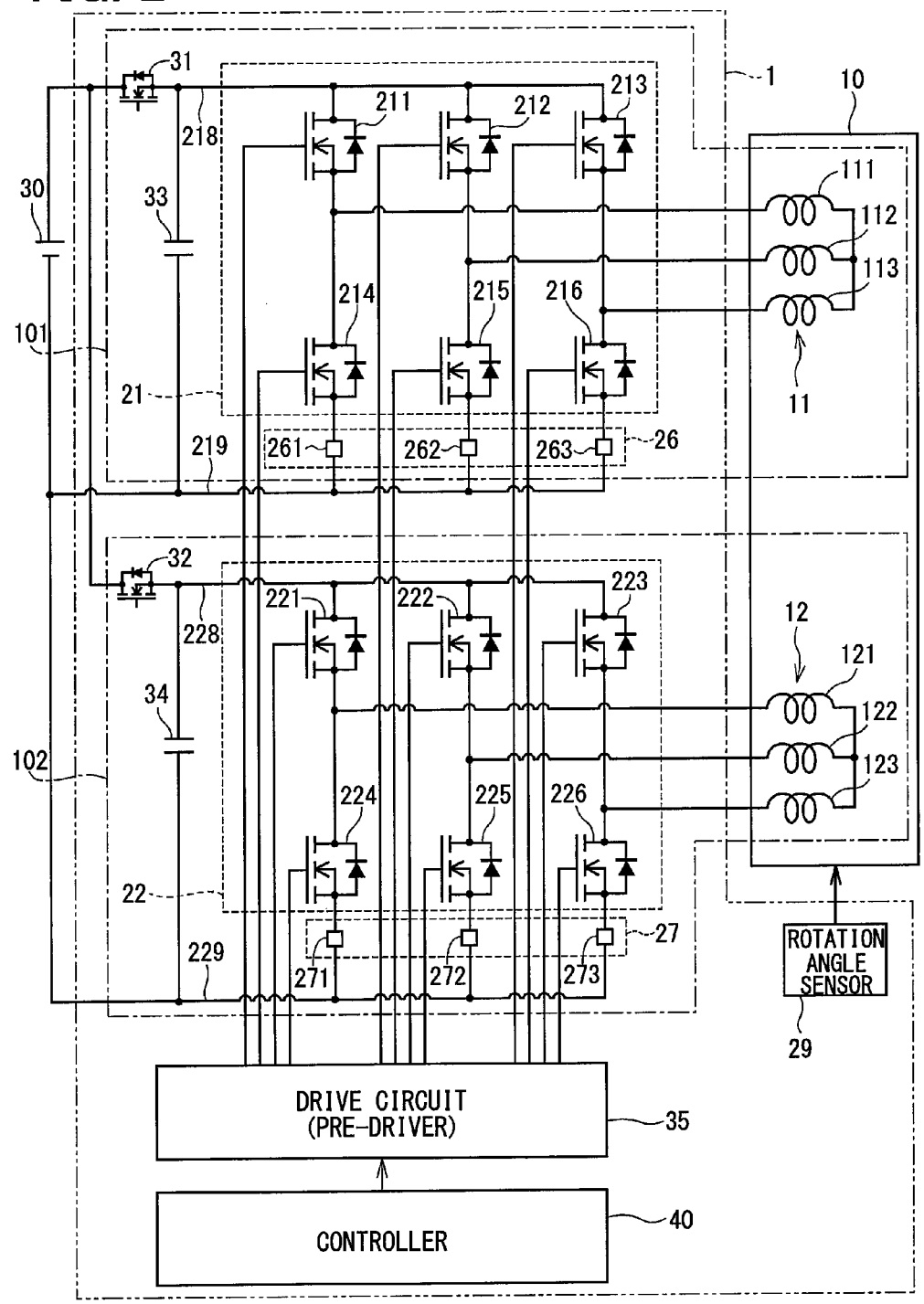
FIG. 2 is a circuit diagram of the electric constitution of a power converter in the first embodiment of the present disclosure.

As shown in FIG. 2, the motor 10 is a three-phase brushless motor, and has a rotor and a stator (not illustrated). The rotor is a cylindrical component, and the permanent magnet is attached on the surface, and has the magnetic pole. The stator has winding groups 11 and 12 wound on the stator. The first winding group 11 comprises a U1 coil 111, a V1 coil 112, and a W1 coil 113. The second winding group 12 comprises a U2 coil 121, a V2 coil 122, and a W2 coil 123.

The power converter 1 includes a first inverter 21, a second inverter 22, a first current detector 26, a second current detector 27, a rotation angle sensor 29, a first power relay 31, a second power relay 32, a first capacitor 33, a second capacitor 34, a drive circuit (pre-driver) 35, a controller 40 and the like.

The first inverter 21 has six first switching elements 211-216 (the "switching element" may hereafter be designated as the "SW element"), and switches the power supply to the coils 111, 112, and 113 of the first winding group 11.

The drain of high potential side SW elements 211, 212, and 213 that are provided on the high potential side is respectively connected with the positive electrode of the battery 30 via a first high side bus line 218.

The source of the high potential side SW elements 211, 212, and 213 is respectively connected with the drain of the low potential side SW elements 214, 215, and 216 that are provided on the low potential side.

The source of low potential side SW elements 214, 215, and 216 is respectively connected with the negative electrode of the battery 30 via a first low side bus line 219.

The junction point of the high potential side SW elements 211, 212, and 213 and the low potential side SW elements 214, 215, and 216 is respectively connected with one end of the U1 coil 111, the V1 coil 112, and the W1 coil 113, respectively.

The second inverter 22 has six second SW elements 221-226, and switches the power supply to the coils 121, 122, and 123 of the second winding group 12.

The drain of high potential side SW elements 221, 222, and 223 is respectively connected with the positive electrode of the battery 30 via a second high side bus line 228.

The source of high potential side SW elements 221, 222, and 223 is respectively connected with the drain of the low potential side SW elements 224, 225, and 226.

The source of low potential side SW elements 224, 225, and 226 is respectively connected with the negative electrode of the battery 30 via a second low side bus line 229.

The junction point of the high potential side SW elements 221, 222, and 223 and the low potential side SW elements 224, 225, and 226 is respectively connected with one end of the U2 coil 121, the V2 coil 122, and the W2 coil 123, respectively.

Although the SW elements 211-216, 221-226 of the present embodiment are all Metal Oxide Field Effect Transistors (MOSFET), Insulated Gate Bipolar Transistor (IGBT), a thyristor, etc., may also be used as the SW elements.

The first current detector 26 comprises current detection elements 261, 262, and 263.

The current detection element 261 is disposed on the low potential side of the SW element 214, and detects the electric current supplied to the U1 coil 111. The current detection element 262 is disposed on the low potential side of SW element 215, and detects the electric current supplied to the V1 coil 112. The current detection element 263 is disposed on the low potential side of SW element 216, and detects the electric current supplied to the W1 coil 113. The electric current detection values that are detected by the first current detector 26 concerning the electric current supplied to the respective phases of the first winding group 11 are hereafter designated as first current detection values Iu1, Iv1, and Iw1.

The second current detector 27 comprises current detection elements 271, 272, and 273.

The current detection element 271 is disposed on the low potential side of SW element 224, and detects the electric current supplied to the U2 coil 121. The current detection element 272 is disposed on the low potential side of SW element 225, and detects the electric current supplied to the V2 coil 122. The current detection element 273 is disposed on the low potential side of SW element 226, and detects the electric current supplied to the W2 coil 123. The electric current detection values that are detected by the second current detector 27 concerning the electric current supplied to the respective phases of the second winding group 12 are hereafter designated as second current detection value Iu2, Iv2, and Iw2.

The current detection elements 261-263, 271-273 of the present embodiment are shunt resistors.

The rotation angle sensor 29 detects the rotation angle of the motor 10.

An electrical angle θ of the motor 10 detected by the rotation angle sensor 29 is outputted to the controller 40.

The first power relay 31 can intercept the electric power supply from the battery 30 to the first inverter 21. Also, the second power relay 32 can intercept the electric power supply from the battery 30 to the second inverter 22.

Although the power relays 31 and 32 are the same MOSFET as SW element 211 and the like, the power relays 31, 32 may also be IGBT, mechanical relays, or the like.

Further, when the power relays 31 and 32 are implemented as MOSFET, etc., it is preferable to use a reverse connection protection relay (not illustrated) that is connected in series with the power relays 31 and 32 for the protection of the power relays 31, 32 due to an accidental reverse connection of the battery 30 or the like.

The first capacitor 33 is connected in parallel with the battery 30 and the first inverter 21. The second capacitor 34 is connected in parallel with the battery 30 and the second inverter 22.

The capacitors 33 and 34 assist the supply of the electric power to the inverters 21 and 22, or control the noise components (e.g. the surge current), by storing electric charge.

In the present embodiment, the first winding group 11 and the first inverter 21, the first current detector 26, the first power relay 31 and the first capacitor 33 for the control of the power supply to the first winding group 11 are collectively designated as a "first system 101"; and the second winding group 12 as well as the second inverter 22, the second current detector 27, the second power relay 32 and the second capacitor 34 for the control of the power supply to the second winding group 12 are collectively designated as a "second system 102". In the following, the number "1" may be used as an index of the component involving a control of the first system 101, and the number "2" may be used as an index of the component involving a control of the second system 102.

The controller 40 conducts a control of the power converter 1 as a whole, and is constituted by a microcomputer, etc., which perform various operations and calculations. Each process in the controller 40 may be a software process by an execution of a program memorized in advance by a Central Processing Unit (CPU), or may be a hardware process realized by an electronic circuit that is dedicated to such process.

The controller 40 generates a control signal that controls ON and OFF switching of the SW elements 211-216, 221-226, based on the steering torque obtained from the torque sensor 94, the electrical angle θ obtained from the rotation angle sensor 29, etc. The generated control signal is outputted to the gate of the SW elements 211-216, 221-226 via the drive circuit (pre-driver) 35.

Figure 3:
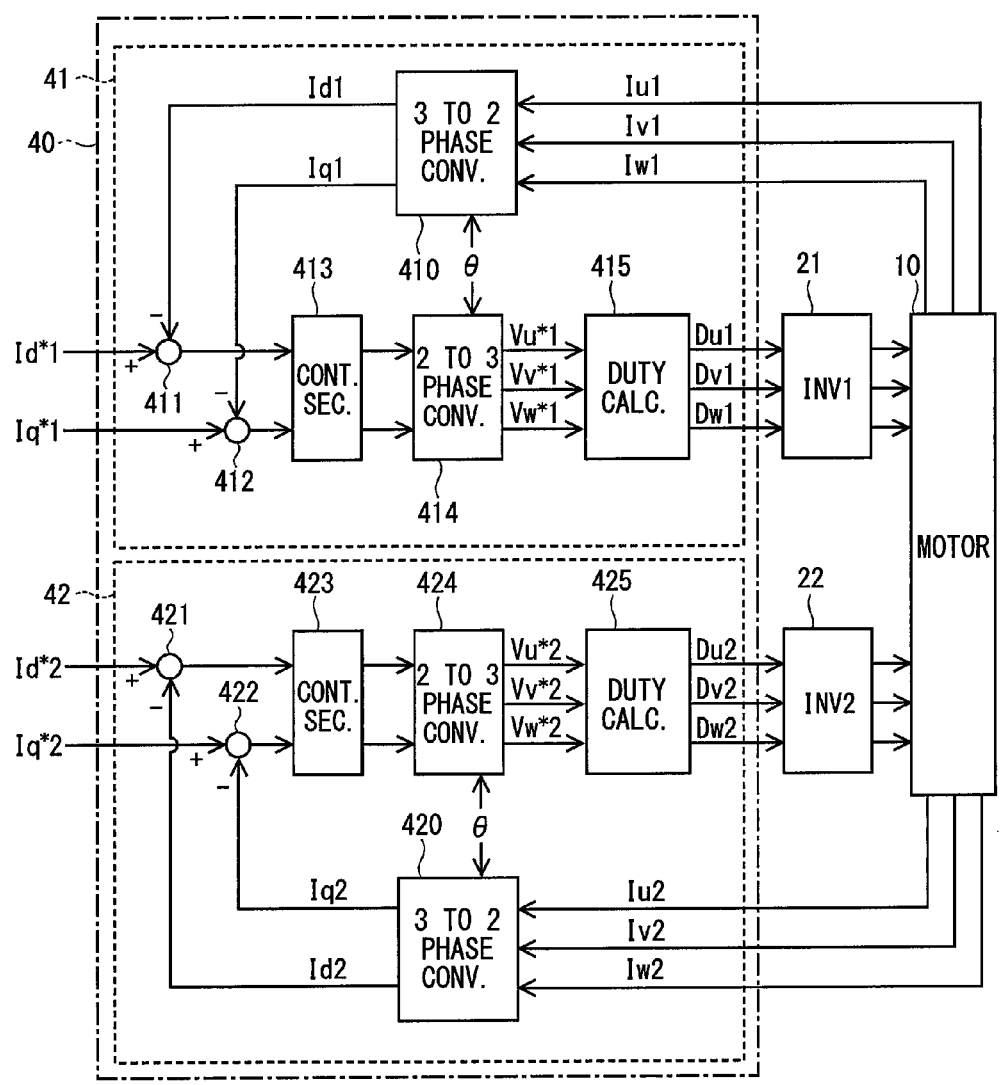
FIG. 3 is a block diagram of a controller in the first embodiment of the present disclosure.

As shown in FIG. 3, the controller 40 has a first instruction calculator 41 concerning a control of the first system 101, and a second instruction calculator 42 concerning a control of the second system 102.

Since the function block of the first instruction calculator 41 to which a number 41*x* is assigned, and the function block of the second instruction calculator 42 to which a number 42*x* is assigned are basically the same (e.g., 411=421), only the function blocks 41*x* are described in the following.

The first instruction calculator 41 includes a 3-to-2 phase converter 410, subtracters 411 and 412, and a control section 413, a 2-to-3 phase converter 414 and a duty calculator 415.

The 3-to-2 phase converter 410 performs, based on the electrical angle θ, a dq conversion on the electric current detection values Iu1, Iv1, and Iw1, which are detected by the first current detector 26 and corrected in terms of an offset error, a gain error, etc. and calculates a d axis electric current detection value Id1 and a q axis electric current detection value Iq1.

The d axis subtracter 411 calculates a d axis electric current deviation ΔId1 which is a deviation between a d axis electric current instruction value Id*1 and the d axis electric current detection value Id1.

The q axis subtracter 412 calculates a q axis electric current deviation ΔIq1 which is a deviation between a q axis electric current command value Iq*1 and the q axis electric current detection value Iq1.

The control section 413 calculates a d axis voltage instruction value Vd*1 and a q axis voltage instruction value Vq*1 by a PI calculation, etc., so that the electric current deviations ΔId1 and ΔIq1 respectively converge to zero.

The 2-to-3 phase converter 414 performs, based on the electrical angle θ, an inverted dq conversion of the d axis voltage instruction value Vd*1 and the q axis voltage instruction value Vq*1, and calculates voltage instruction values Vu*1, Vv*1, and Vw*1.

The duty calculator 415 calculates duty instruction values Du1, Dv1, and Dw1, based on the voltage instruction values Vu*1, Vv*1, and Vw*1.

A duty calculator 425 of the second instruction calculator 42 calculates duty instruction values Du2, Dv2, and Dw2, based on the voltage instruction values Vu*2, Vv*2, and Vw*2.

Hereafter, the calculation of the first duty instruction values Du1, Dv1, Dw1, which are instructions concerning a control of the first inverter 21, and the calculation of the second duty instruction values Du2, Dv2, Dw2, which are instructions concerning a control of the second inverter 22, are respectively described in full details.

In the present embodiment, based on a first neutral point voltage Vn1, which is a neutral point voltage of the voltages Vu1, Vv1, Vw1 applied to the first winding group 11 and a second neutral point voltage Vn2, which is a neutral point voltage of the voltages Vu2, Vv2, Vw2 applied to the second winding group 21, the duty instruction values Du1, Dv1, Dw1, Du2, Dv2, Dw2 are calculated so that one of the Vn1 and the Vn2 is shifted above a center-of-output value VM that is a center value of an outputtable voltage range, and the other of the Vn1 and the Vn2 is shifted below the center-of-output value VM. In the present embodiment, a first period P1 is defined as a period in which the first neutral point voltage Vn1 is shifted below the center-of-output value VM, and the second neutral point voltage Vn2 is shifted above the center-of-output value VM; and a second period P2 is defined as a period in which the first neutral point voltage Vn1 is shifted above the center-of-output value VM, and the second neutral point voltage Vn2 is shifted below the center-of-output value VM.

The duty instruction values Du1, Dv1, Dw1, Du2, Dv2, and Dw2 are calculated to be within a preset value range in consideration of a required electric current detection time of the current detectors 26 and 27. According to the present embodiment, a lower limit value DL of the duty instruction values Du1, Dv1, Dw1, Du2, Dv2, and Dw2 is set to 4[%], and an upper limit value DH is set to 93[%]. Further, the duty conversion value of the center-of-output value VM is set as a center-of-output duty DM. The center-of-output duty DM is 50[%].

By shifting one of the first neutral point voltage Vn1 and the second neutral point voltage Vn2 above the center-of-output value VM, and shifting the other below the value VM, the vector generation timing of the first inverter 21 (i.e., when a zero voltage vector and an effective voltage vector are generated in the first inverter 21), and the vector generation timing of the second inverter 22 (i.e., when a zero voltage vector and an effective voltage vector are generated in the second inverter 22) become respectively different timings. In such manner, the ripple current of the capacitors 33 and 34 are reduced.

When the first neutral point voltage Vn1 is shifted below the center-of-output value VM, in the first inverter 21, a longer ON period occurs for the low potential side SW elements 214-216 than for the high potential side SW elements 211-213.

Similarly, when the second neutral point voltage Vn2 is shifted below the center-of-output value VM, in the second inverter 22, a longer ON period occurs for the low potential side SW elements 224-226 than for the high potential side SW elements 221-223.

When the first neutral point voltage Vn1 is shifted above the center-of-output value VM, in the first inverter 21, a longer ON period occurs for the high potential side SW elements 211-213 than for the low potential side SW elements 214-216.

Similarly, when the second neutral point voltage Vn2 is shifted above the center-of-output value VM, in the second inverter 22, a longer ON period occurs for the high potential side SW elements 221-223 than for the low potential side SW elements 224-226.

Therefore, in the present embodiment, in order to prevent overheating of a part of the SW elements 211-216, 221-226, two states, (i.e., a first state in which the first neutral point voltage Vn1 is shifted downward and the second neutral point voltage Vn2 is shifted upward, and a second state in which the first neutral point voltage Vn1 is shifted upward and the second neutral point voltage Vn2 is shifted downward) are switched. Thereby, generation of heat from the SW elements 211-216, 221-226 is distributed among two systems 101 and 102.

In such case, when the rotation speed of the motor 10 is low, the SW elements 211-216, 221-226 may easily have uneven ON times and OFF times among themselves, thereby having a great temperature difference among them. On the other hand, when the rotation speed of the motor 10 is high, such unevenness of ON/OFF times may be hard to occur. Therefore, according to the present embodiment, based on the rotation speed of the motor 10, the switch period Pc is variably defined. In this case, the rotation speed of the motor 10 may be the number of rotations in a unit of "rpm" or the like, or may be a rotation angular speed and the like.

Figure 4:
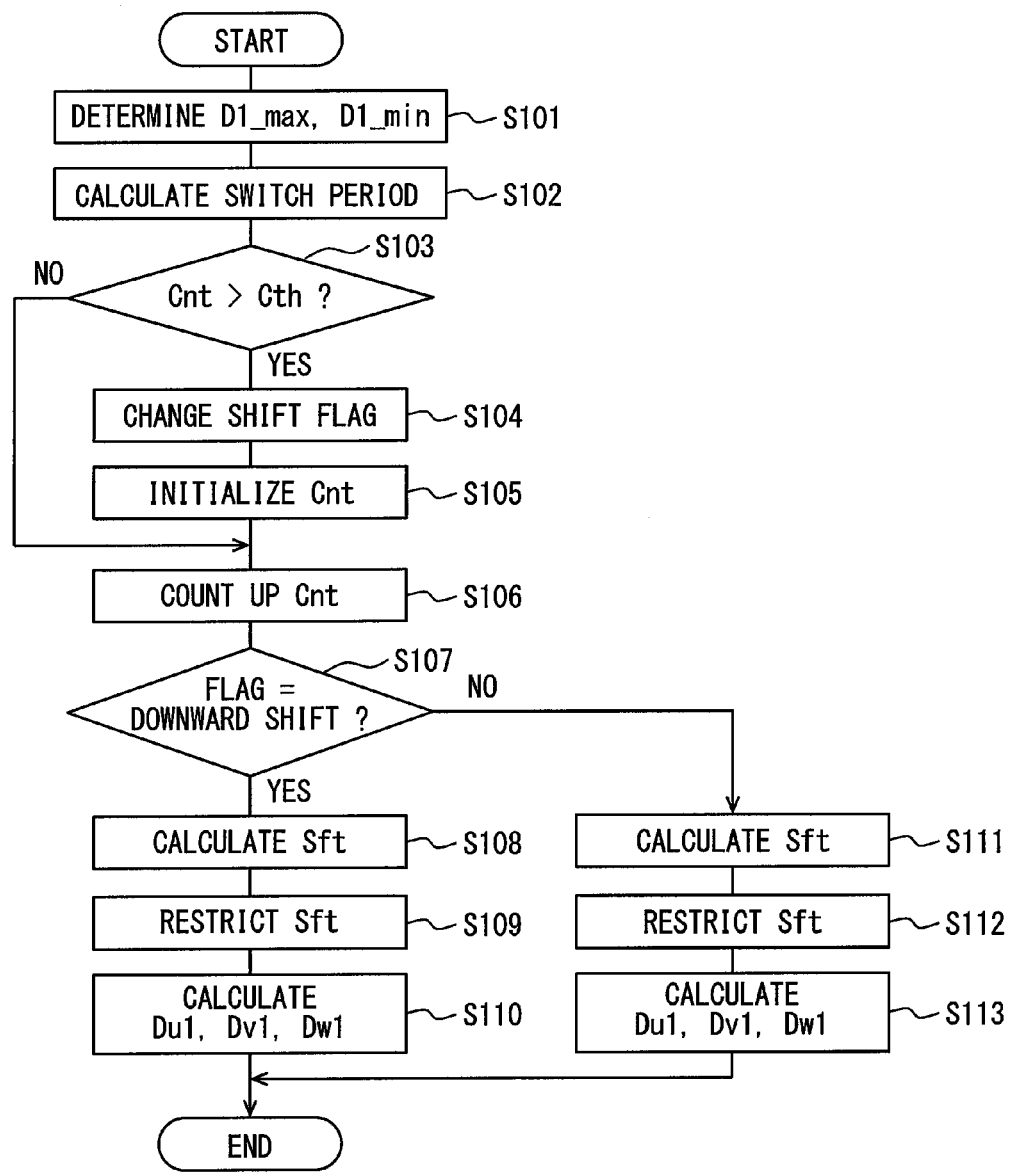
FIG. 4 is a flowchart of an instruction calculation process in the first embodiment of the present disclosure.

An instruction calculation process of the present embodiment is described based on the flowchart shown in FIG. 4. The process of FIG. 4 is performed at predetermined intervals by the duty calculator 415. The calculation of the first duty instruction values Du1, Dv1, Dw1 and the calculation of the second duty instruction values Du2, Dv2, Dw2 are the same process, thereby description of the calculation of the Du2-Dw2 is omitted.

In the first step(S) S101, among pre-shift duty instruction values Du1_b, Dv1_b, Dw1_b, which are the duty conversion values of the voltage instruction values Vu*1, Vv*1, Vw*1, the largest value is designated as "D1_max," and the smallest value is designated as "D1_min."

Figure 5:
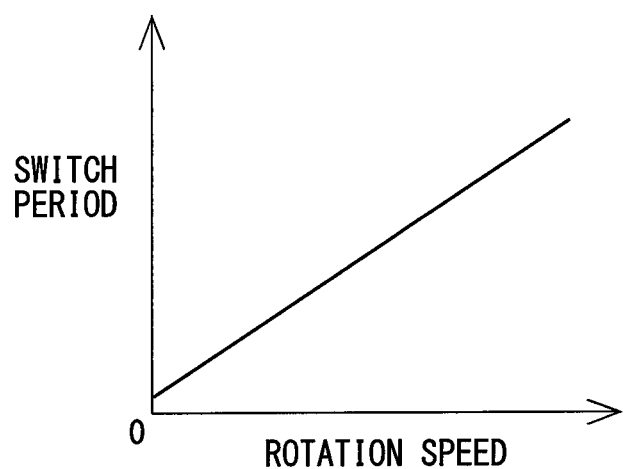
FIG. 5 is a diagram of a relationship of a rotation speed and a switch period in the first embodiment of the present disclosure.

In S102, the switch period Pc is calculated based on the rotation speed of the motor 10. The switch period Pc is calculated as a longer period when the rotation speed of the motor 10 is low, as shown in FIG. 5, and as a shorter period when the rotation speed is high.

In S103, it is determined whether a count value Cnt of a counter, which counts a lapse time from a switching of the shift directions is greater than a count determination value Cth, which is a predetermined count value according to the switch period Pc.

When the count value Cnt is determined to be equal to or less than the count determination value Cth (i.e., when the switch period Pc has not passed after the switching of the shift directions) (S103:NO), the process proceeds to S106.

The shift flag is maintained as the previous value at such time.

When it is determined that the count value Cnt is greater than the count determination value Cth (i.e., when the switch period Pc has passed after the switching of the shift directions) (S103:YES), the process proceeds to S104.

The shift flag is changed in S104. More practically, when the previous value of the shift flag is "an upward shift," the shift flag is changed to "a downward shift." When the previous value of the shift flag is "the downward shift," the shift flag is changed to "the upward shift."

The count value Cnt is initialized in S105.

The count value Cnt is counted up in S106.

In S107, it is determined whether the shift flag indicates the downward shift. When it is determined that the shift flag is not indicating the downward shift (i.e., when the shift flag is the upward shift) (S107:NO), the process proceeds to S111. When it is determined that the shift flag is indicating the downward shift (S107:YES), the process proceeds to S108.

In S108, a shift amount Sft is calculated. The shift amount Sft is a difference between the duty conversion value Dn1 and the center-of-output duty DM of the neutral point voltage Vn1 in the present amplitude, and is represented with an equation (1). In the following, an "equation" may indicate either an equation or an in equation.

$$Sft = |Dn1 - DM| \qquad \text{Equation (1)}$$

The shift amount Sft is restricted in S109.

The upper limit of the shift amount Sft is set to 0. The lower limit of the shift amount Sft is represented by an equation (2).

$$D1\_min - Sft \geq DL$$

$$Sft \leq D1\_min - DL$$

$$Sft \leq D1\_min - 4 \qquad \text{Equation (2)}$$

In S110, the first duty instruction values Du1, Dv1, Dw1 are calculated. The first duty instruction values Du1, Dv1, Dw1 are represented with equations (3-1)-(3-3).

$$Du = Du1\_b - Sft \qquad \text{Equation (3-1)}$$

$$Dv = Dv1\_b - Sft \qquad \text{Equation (3-2)}$$

$$Dw = Dw1\_b - Sft \qquad \text{Equation (3-3)}$$

In S111, which is performed when the shift flag is the upward shift (S107:NO), the shift amount Sft is calculated by an equation (1) just like S108.

The shift amount Sft is restricted in S112. The lower limit of the shift amount Sft is set to 0. The upper limit of the shift amount Sft is represented by an equation (4).

$$D1\_max + Sft \leq DH$$

$$Sft \leq DH - D1\_max$$

$$Sft \leq 93 - D1\_max \qquad \text{Equation (4)}$$

In S113, the first duty instruction values Du1, Dv1, Dw1 are calculated. The first duty instruction values Du1, Dv1, Dw1 are represented by equations (5-1)-(5-3).

$$Du = Du1\_b + Sft \qquad \text{Equation (5-1)}$$

$$Dv = Dv1\_b + Sft \qquad \text{Equation (5-2)}$$

$$Dw = Dw1\_b + Sft \qquad \text{Equation (5-3)}$$

According to the present embodiment, a switch cycle, or switch period is shortened when the rotation speed of the motor 10 is low. Thereby, the unevenness of heat generation among the elements is reduced.

If an electric current integrated value is used as a parameter concerning the switching between the upward shift and the downward shift, for example, the rise of the electric current integrated value is slow when the rotation speed of the motor 10 is low. Here, the switching takes more time to reach the threshold value, making it possible to have uneven heat generation among many SW elements.

In consideration of the above, the switch cycle is configured to be short when the rotation speed of the motor 10 is low in the present embodiment, as mentioned above. Therefore, the unevenness of heat generation among the SW elements is appropriately reduced.

Further, when the rotation speed of the motor 10 is high, the switch cycle is extended to be a longer period, because it is hard to cause the unevenness of heat generation among the SW elements in such condition. Thereby, the torque ripple accompanying the switching of the upward shift and the downward shift is reduced.

According to the present embodiment, based on the rotation speed of the motor 10, the switch cycle is variably set. The rotation speed of the motor 10 may be considered as an "instantaneous value of a physical quantity concerning the drive of the motor," which is more easily calculable in comparison to the electric current integrated value that requires more memory and other calculation resources for storing, and for calculating an integrated value of the electric current and the like. That is, a control of the switch period based on the motor rotation speed enables a reduction of system resource such as a memory area and the like.

As described in full details above, the power converter 1 of the present embodiment converts the electric power for the motor 10, which has the first winding group 11 and the second winding group 12, and the converter 1 is provided with the first inverter 21, the second inverter 22, and the controller 40.

The first inverter 21 includes the first SW elements 211-216 provided in corresponding manner to each of the plural phases of the first winding group 11.

The second inverter 22 includes the second SW elements 226-226 provided in corresponding manner to each of the plural phases of the second winding group 12.

The controller 40 has the duty calculators 415 and 425, which calculate (i) the first duty instruction values Du1, Dv1, Dw1 concerning the voltage applied to the first winding group 11 and (ii) the second duty instruction values Du2, Dv2, and Dw2.

Further, in the first period P1, the first neutral point voltage Vn1 applied to the first winding group 11 shifts below the center-of-output value VM of the outputtable range, of the inverter (21) and the second neutral point voltage Vn2 applied to the second winding group 12 shifts above the center-of-output value VM of the outputtable range of the inverter (22).

Further, in the second period P2, the first neutral point voltage Vn1 shifts above the center-of-output value VM, and the second neutral point voltage Vn2 shifts below the center-of-output value VM.

When the switch period Pc, which is variably calculated based on the preset physical quantity, has lapsed, the duty calculators 415 and 425 calculate the first duty instruction values Du1, Dv1, Dw1 and the second duty instruction values Du2, Dv2, Dw2, so that the first period P1 and the second period P2 are switched.

According to the present embodiment, two states are switched (i.e., alternated, at an interval of the switch period Pc, (i.e., one state in which the first neutral point voltage Vn1 is shifted above the center-of-output value VM, and the second neutral point voltage Vn2 is shifted below the center-of-output value VM; and the other state in which the first neutral point voltage Vn1 is shifted below the center-of-output value VM, and the second neutral point voltage Vn2 is shifted above the center-of-output value VM). In such manner, the uneven heat generation among the SW elements 211-216 and 221-226 is reduced.

Further, based on the preset physical quantity, the switch period Pc is variably determined. Thereby, the vibration and the sound accompanying the switching between the first period P1 and the second period P2 is reduced.

According to the present embodiment, the preset physical quantity is the rotation speed of the motor 10. More specifically, the lower the rotation speed of the motor 10 is, the shorter the switch cycle is made, which relies on how the switch period Pc is calculated.

Therefore, the unevenness of heat generation among the SW elements is reduced when the rotation speed of the motor 10 is low. Further, the torque ripple accompanying the switching at a time when the rotation speed of the motor 10 is high is reduced.

According to the present embodiment, the duty calculators 415 and 425 correspond to an "instruction calculator." The first duty instruction values Du1, Dv1, Dw1 correspond to a "first voltage instruction value", and the second duty instruction values Du2, Dv2, Dw2 correspond to a "second voltage instruction value." The rotation speed of the motor 10 corresponds to "preset physical quantity."

Second Embodiment

Figure 6A:
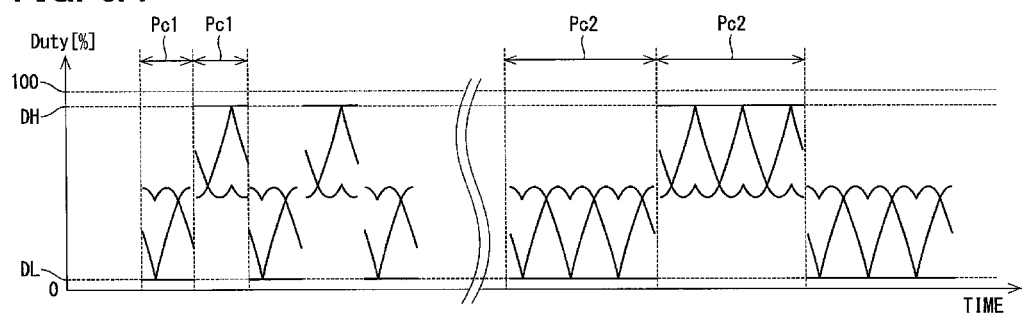
FIGS. 6A/B are time diagrams of a relationship of the rotation speed and the switch period in a second embodiment of the present disclosure.
Figure 6B:
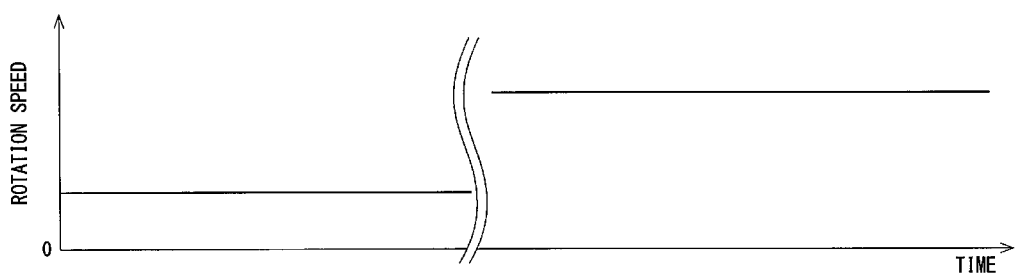

The second embodiment of the present disclosure is described based on FIGS. 6A/B.

According to the present embodiment, the duty calculator 415 of the first instruction calculator 41 performs a modulation process of the voltage instruction values Vu*1, Vv*1, Vw*1, and calculates the first duty instruction values Du1, Dv1, Dw1, and the duty calculator 425 of the second instruction calculator 42 performs the modulation process of the voltage instruction values Vu*2, Vv*2, Vw*2, and calculates the second duty instruction values Du2, Dv2, and Dw2.

Here, the modulation process is described.

According to the present embodiment, a "low-end set modulation process" is defined as a modulation process in which one of the smallest among the first duty instruction values Du1, Dv1, and Dw1 is set to a preset value. Similarly, the "low-end set modulation process" is defined as a modulation process in which one of the smallest among the second duty instruction values Du2, Dv2, and Dw2 is set to a preset value. By performing the low-end set modulation process, the neutral point voltages Vn1 and Vn2 are shifted below the center-of-output value VM.

Further, a "high-end set modulation process" is defined as a modulation process in which one of the highest among the first duty instruction values Du1, Dv1, and Dw1 is set to a preset value. Similarly, the "high-end set modulation process" is defined as a modulation process in which one of the highest among the second duty instruction values Du2, Dv2, and Dw2 is set to a preset value. By performing the high-end set modulation process, the neutral point voltages Vn1 and Vn2 are shifted above the center value of the output. That is, according to the present embodiment, by performing the high-end set modulation process, the neutral point voltages Vn1 and Vn2 are shifted above the center-of-output value VM.

By performing the modulation process, the voltage use efficiency is improved.

According to the present embodiment, one of the first duty instruction values Du1, Dv1, Dw1 and the second duty instruction values Du2, Dv2, Dw2 undergo the low-end set modulation process, and the other undergo the high-end set modulation process. Thereby, one of the first neutral point voltage Vn1 and the second neutral point voltage Vn2 is shifted below the center-of-output value VM, and the other is shifted above the center-of-output value VM.

According to the present embodiment, based on the rotation speed of the motor 10, the switch period Pc is variably determined just like the above-mentioned embodiment. The calculation method of the switch period Pc is the same as that of the above-mentioned embodiment.

In the present embodiment, as shown in FIG. 6A/B, the switch period Pc1 at a time when the rotation speed of the motor 10 is low is shorter than the switch period Pc2 when the rotation speed is high. That is, Pc1<Pc2. In such manner, the same effects as the above-mentioned embodiment are achieved.

Third Embodiment

Figure 7:
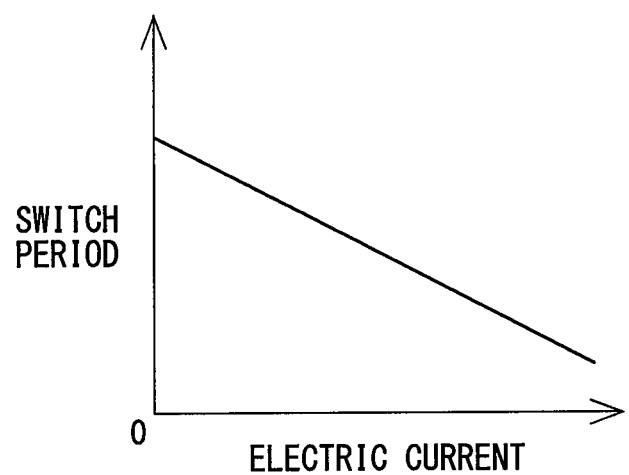
FIG. 7 is a diagram of a relationship of an electric current and the switch period in a third embodiment of the present disclosure.

The third embodiment of the present disclosure is described based on FIG. 7.

The calculation method of the switch period Pc is different in the third to sixth embodiments from the above embodiments. The other points that are the same as the above embodiments (i.e., the modulation process) may be performed just like the first embodiment, or may not be performed just like the second embodiment.

According to the present embodiment, the switch period Pc is calculated based on the current detection values Iu1, Iv1, Iw1, Iu2, Iv2, and Iw2 detected by the current detectors 26 and 27.

The electric current supplied to the switching elements 211-216, 221-226 is large when the current detection values Iu1, Iv1, Iw1, Iu2, Iv2, and Iw2 are large. Therefore, as the amplitude of the current detection values Iu1, Iv1, Iw1, Iu2, 1v2, and Iw2 becomes large, the switch period Pc is shortened, as shown in FIG. 7, for example.

Further, as a value concerning the electric current flowing to the winding groups 11 and 12, instead of using the current detection values Iu1, Iv1, Iw1, Iu2, Iv2, and Iw2, the switch period Pc may be calculated by using the electric current instruction value, or the electric current estimation value.

The electric current detection values and/or the electric current instruction values used for such calculation may be derived from each of the three phases, or may be derived from each of the d/q axes.

Further, the switch period Pc may be calculated based on a value concerning the electric current flowing in only one of the first winding group 11 and the second winding group 12.

In the present embodiment, the preset physical quantity is at least one of the electric current flowing in only one of the first winding group 11 and the second winding group 12. Thereby, the unevenness of heat generation among the SW elements 211-216, 221-226 is appropriately reduced.

Fourth Embodiment

Figure 8:
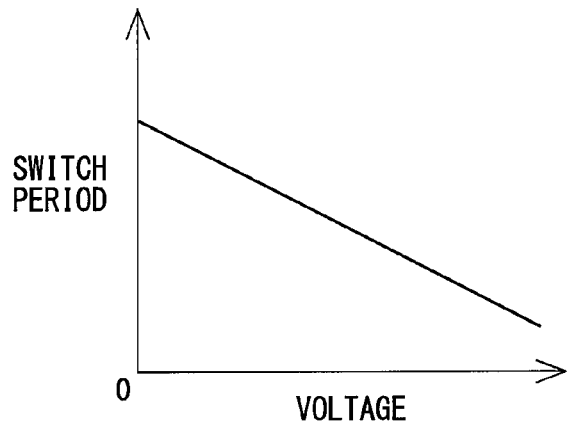
FIG. 8 is a diagram of a relationship of a voltage and the switch period in a fourth embodiment of the present disclosure.

The fourth embodiment of the present disclosure is described based on FIG. 8.

According to the present embodiment, the voltages applied to the first winding group 11 and the second winding group 12 are detected, and the switch period Pc is calculated based on the voltage detection value. The voltage detection value may be a terminal voltage detection value, for example.

The greater the voltages applied to the first winding group 11 and the second winding group 12 are, the higher the probability of high heat generation by the switching elements 211-216, 221-226 becomes. Therefore, for example, the larger the amplitude of the voltage detection value is, the shorter the switch period Pc is made, as shown in FIG. 8.

In such case, instead of using the voltage detection value, the switch period Pc may be calculated based on the voltage instruction value.

Further, the voltage instruction value may be a duty converted value.

Further, the electric current detection values and/or the electric current instruction values used for such calculation may be derived from each of the three phases, or may be derived from each of the d/q axes.

Further, the switch period Pc may be calculated based on the value concerning only one of the voltage applied to the first winding group 11, and the voltage applied to the second winding group 12.

In the present embodiment, the preset physical quantity is at least one of the voltage applied to the first winding group 11, and the voltage applied to the second winding group 12. Thereby, the unevenness of heat generation among the SW elements 211-216, 221-226 is appropriately reduced.

Fifth Embodiment

Figure 9:
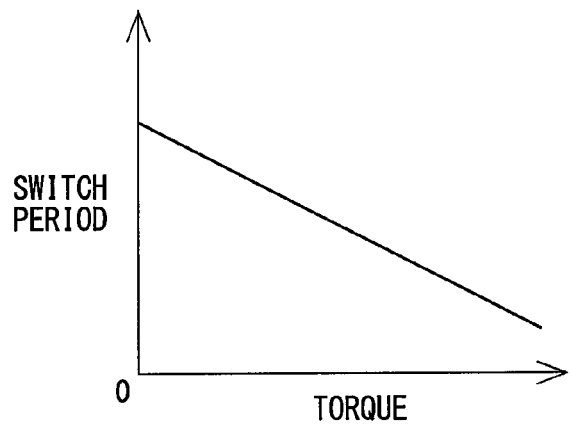
FIG. 9 is a diagram of a relationship of a torque and the switch period in a fifth embodiment of the present disclosure.

The fifth embodiment of the present disclosure is described based on FIG. 9.

According to the present embodiment, the switch period Pc is calculated based on the torque of the motor 10. Based on the current detection values or the current instruction values, the torque of the motor 10 is calculable, for example. The greater the torque of the motor 10 is, the higher the probability of high heat generation by the switching elements 211-216, 221-226 becomes.

Therefore, as the torque of the motor 10 increases, the switch period Pc is shortened, as shown in FIG. 9, for example.

Further, instead of using the torque of the motor 10, the switch period Pc may be calculated based on the steering torque detected by the torque sensor 94.

In the present embodiment, the preset physical quantity is the torque of the motor 10. Thereby, the unevenness of heat generation among the SW elements 211-216, 221-226 is appropriately reduced.

Sixth Embodiment

Figure 10:
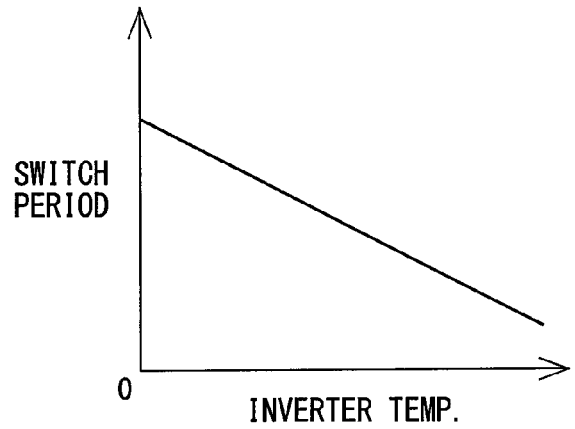
FIG. 10 is a diagram of a relationship of an inverter temperature and the switch period in a sixth embodiment of the present disclosure.

The sixth embodiment of the present disclosure is described based on FIG. 10.

According to the present embodiment, the switch period Pc is calculated based on the inverter temperature which is the temperature of the inverters 21 and 22. That is, a temperature sensor which is not illustrated may be disposed on the inverters 21 and 22, and the switch period Pc may be calculated based on the detection value of the temperature sensor concerned.

The switch period Pc may also be calculated based on the estimated temperature based on the electric current detection value or the electric current instruction value. That is, as shown in FIG. 10, the switch period Pc may be shortened, as the temperature of the inverters 21 and 22 increases.

The switch period Pc may also be calculated based on the temperature of one of the first inverter 21 or the second inverter 22.

In the present embodiment, the preset physical quantity is the temperature of at least one the first inverter 21 and the second inverter 22. Thereby, based on the temperature of the first inverter 21 and the second inverter 22, the unevenness of heat generation among the SW elements 211-216, 221-226 is reduced more appropriately.

Seventh Embodiment

Figure 11A:
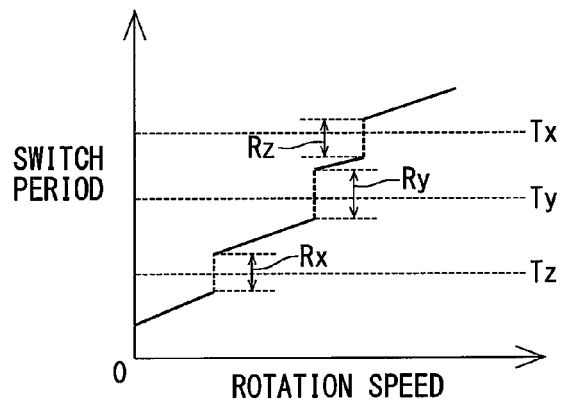
FIGS. 11A/B are diagrams of a relationship of a resonance frequency and switch period in a seventh embodiment of the present disclosure.

The seventh embodiment of the present disclosure is described based on FIGS. 11A/B.

Figure 11B:
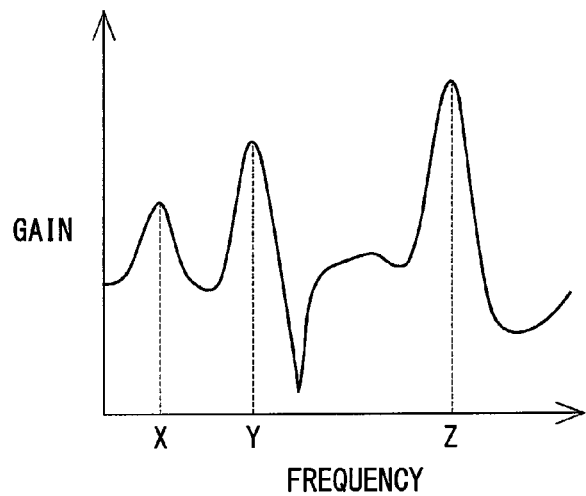

According to the present embodiment, the power converter 1 is disposed in a vehicle. That is, in the present embodiment, a vehicle corresponds to a "system in which the rotating electric machine is installed." As shown in FIG. 11B, in a vehicle, the size of the gain changes according to the frequency. In the present embodiment, when the gain takes a peak value at certain frequencies, such frequencies are defined as resonance frequencies X, Y, and Z.

Further, in the power converter 1, when the switching between the upward shift and the downward shift is performed at the same cycle as the resonance frequencies X, Y, and Z, the vibration and/or the sound may become larger than the switching at the other cycles.

Therefore, according to the present embodiment, the switch period Pc is calculated so that the switch period Pc does not fall in a resonance region Rx, Ry, or Rz, which are respectively defined as a certain frequency region that includes a time Tx, a time Ty, or a time Tz respectively derived as a time conversion value of the resonance frequency X, Y, or Z, as shown in FIG. 11A.

Although FIGS. 11A/B illustrate an example of calculating the switch period Pc based on the rotation speed of the motor 10, the same scheme is usable when the switch period Pc is calculated based on the electric current, the voltage, the torque, or the temperature of the inverters 21 and 22. The same applies to the eighth embodiment mentioned later.

Although FIGS. 11A/B respectively illustrate an example of having three resonance regions Rx, Ry, Rz, the number of resonance regions may be arbitrarily determined according to the resonance frequency of the vehicle. Further, the width of the resonance region may be different region to region. The resonance regions Rx, Ry, Rz may have respectively different region widths.

According to the present embodiment, the switch period Pc is calculated by avoiding the resonance regions Rx, Ry, Rz, which are respectively calculated as regions including the time conversion values Tx, Ty, Tz of the resonance frequencies X, Y, Z. Thereby, an increase of the vibration and the noise due to the resonance is prevented.

Eighth Embodiment

Figure 12:
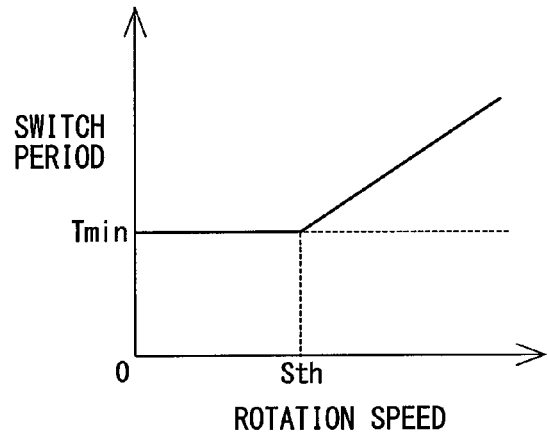
FIG. 12 is a diagram of a relationship of the rotation speed and the switch period in an eighth embodiment of the present disclosure.

The eighth embodiment of the present disclosure is described based on FIG. 12.

According to the present embodiment, generation of human-audible noise is prevented by setting the switch period Pc to a frequency range outside a human audible range. More specifically, when the lower limit frequency of the human audible range is Hmin (e.g., 20 Hz), the switch period Pc may be set to be equal to or higher than a lower limit Tmin (e.g., 50 ms), which is a time conversion value of Hmin.

That is, when the rotation speed is less than a threshold value Sth, the switch period Pc is set to the lower limit Tmin, and, as the rotation speed increases, (i.e., exceeds the threshold value Sth), the switch period Pc may also be increased. In such manner, the switch period Pc is controlled to be equal to or greater than the lower limit Tmin, generation of the noise accompanying the switching between the upward shift and the downward shift is prevented.

When, instead of using the rotation speed, using the electric current, the voltage, the torque, or the inverter temperature, the switch period Pc may be set to the lower limit Tmin if the above-described parameter is equal to or greater than a threshold value. Thereby, the calculated switch period Pc becomes equal to or greater than the lower limit Tmin.

According to the present embodiment, the switch period Pc is calculated so as not to fall in a human audible frequency range. In such manner, the noise accompanying the switching between the first period P1 and the second period P2 is prevented.

OTHER EMBODIMENTS (a) Instruction Calculator

According to the above-mentioned embodiments, the first duty instruction values calculated by the duty calculator correspond to a "first voltage instruction value," and the second duty instruction values calculated by the duty calculator correspond to a "second voltage instruction value."

According to other embodiments, pre-duty-conversion voltage instruction values may undergo a shift process, and the after-shift voltage instruction values after the shift process may be converted to the duty.

The same may apply to the modulation process. That is, the voltage instruction values before the duty conversion may be considered as the first voltage instruction value and the second voltage instruction value, for example, and the function blocks such as a modulation processor and a shift processor may be disposed at a position between the controllers 413 and 423 of the first embodiment, and the duty calculators 415 and 425. In such case, the modulation processor and the shift processor correspond to an "instruction calculator."

In the above-mentioned embodiment, the time constant of the low pass filter, which performs filtering of the target shift amount, is the preset time constant.

According to other embodiments, in consideration of the point that the responsiveness of the motor changes according to the size of the electric current, the time constant may be a variable value according to the size of the electric current. Here, "the size of the electric current" may indicate a value that is based on the electric current detection value, or based on the electric current instruction value.

According to the above-mentioned embodiments, the target shift amount is filtered.

According to other embodiments, by using after-filtering other parameters other than the target shift amount, the calculation of the first voltage instruction value and the second voltage instruction value may be configured to control the time constant of the change of the first neutral point voltage, and the second neutral point voltage to be greater than the preset time constant.

(b) Electric Current Detector

According to the above-mentioned embodiments, the electric current detector is a shunt resistor, and is disposed at a position on the low potential side of the low potential side SW element.

According to other embodiments, the electric current detector may be not necessarily the shunt resistor, but a Hall IC, etc., for example.

Further, according to other embodiments, the electric current detector may be disposed at various positions other than the low potential side of the low potential side SW element, such as a position on the high potential side of the high potential side SW element, a position between the winding group and the inverter, or the like.

(c) Rotating Electric Machine

In the above-mentioned embodiments, the rotating electric machine is the brushless motor having the three phases.

In other embodiments, the polyphase rotating electric machine other than having the three phases (e.g., having four phases or more) may also be usable.

Further, other than the brushless motor, any motor may also be usable.

Further, the rotating electric machine may be not only a motor but a generator, and may be a motor-generator having the functions of the electric motor and of the generator.

According to the above-mentioned embodiments, the rotating electric machine is applied to an electric power steering apparatus.

According to other embodiments, the rotating electric machine may be applied to devices other than the electric power steering apparatus.

Although the present disclosure has been described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. An electric power converter for converting an electric power supplied to a rotation electric machine that has a first winding group and second winding group, the power converter comprising:

a first inverter having a first switching element corresponding to plural phases in the first winding group;

a second inverter having a second switching element corresponding to each of plural phases in the second winding group; and a controller that includes an instruction calculator calculating a first voltage instruction value that is applied to the first winding group, and a second voltage instruction value that is applied to the second winding group, wherein an application voltage to the first winding group is controlled (i) in a first period so that a first neutral point voltage shifts below a center-of-output value of an outputtable range is outputted, and a second neutral point voltage shifts above the center-of-output value of the outputtable range and (ii) in a second period so that the first neutral point voltage shifts above the center-of-output value of the outputtable range, and the second neutral point voltage shifts below the center-of-output value of the outputtable range, and the instruction calculator calculates the first instruction value and the second instruction value for enabling a switching between the first period and the second period, after a lapse of a switch period that is variably calculated based on a preset physical quantity.

2. The electric power converter of claim 1, wherein the preset physical quantity comprises a rotation speed of the rotating electric machine.

3. The electric power converter of claim 1, wherein the preset physical quantity comprises an electric current flowing in at least one of the first winding group and the second winding group.

4. The electric power converter of claim 1, wherein the preset physical quantity comprises a voltage applied to at least one of the first winding group and the second winding group.

5. The electric power converter of claim 1, wherein the preset physical quantity comprises a torque of the rotating electric machine.

6. The electric power converter of claim 1, wherein the preset physical quantity comprises a temperature of at least one of the first inverter and the second inverter.

7. The electric power converter of claim 1, wherein the switch period is calculated by avoiding a resonance range that includes a time conversion value of a system resonance frequency regarding a system in which the rotating electric machine is installed.

8. The electric power converter of claim 1, wherein the switch period is calculated by avoiding a human audible range that corresponds to a frequency range audible by human being.

* * * * *